Jan. 31, 1961  A. P. HENRY  2,969,773
HYDRAULIC VALVE-CONTROLLED SERVO DEVICE
Filed May 3, 1956  3 Sheets-Sheet 2

INVENTOR.
Augustus P. Henry
BY
Augustus M. Henry
Attorney

United States Patent Office 2,969,773
Patented Jan. 31, 1961

2,969,773

HYDRAULIC VALVE-CONTROLLED SERVO DEVICE

Augustus P. Henry, Los Angeles, Calif., assignor, by mesne assignments, to Kelsey-Hayes Company, Detroit, Mich., a corporation of Delaware Filed May 3, 1956, Ser. No. 582,470

15 Claims. (Cl. 121—41)

This invention relates to new and useful improvements in a valve controlled servo device. The mechanism disclosed in the description of the invention results in a type of operation heretofore unachieved in the hydraulics art, which operation has highly desirable characteristics and which can be effected by mechanism which is considerably easier to fabricate than conventional types.

This application is a continuation-in-part of the applicant's prior co-pending application, Serial No. 538,180, filed October 3, 1955, and now abandoned.

By a valve controlled servo device, as that phrase is used herein, is meant a fluid powered apparatus, the output of which can be rectilinear extension of a piston and cylinder combination (or rotational displacement of a shaft if a rotary actuating device is used) which output is controlled by admitting properly modulated flow of pressurized fluid to or from one or more chambers of variable volume contained within the structure of the actuating member, which apparatus is further characterized by an external closed loop feedback arrangement.

A prime requirement of any servo device, or servomechanism, is that it has associated with it an outer feedback loop closure whereby the output member position can be continuously fed back and referred to a command input. The command input (desired output position) is compared with the output (actual) position with the instantaneous difference, or error, being the exciting variable to the servo. A servo device can be considered to be a power control mechanism excited by the instantaneous error existing within the system, with the error further defined as the instantaneous difference, or lack of correspondence, between a command input and the existing position of the output member.

The power medium in this instance is the pressurized fluid which is supplied by an outside agent. The fluid is presumed to be a relatively incompressible liquid, as for example a mineral base oil, but it should be pointed out that the invention is of usefulness if the fluid power medium is a compressible gas or vapor.

The present invention is of utility in connection with hydraulic servo devices where precise positional control, usually against appreciable load, is required. The invention is of usefulness in manned and unmanned aircraft primary control surface actuation, automatic control of gun mounts and turrets, radar antenna drive mechanisms, machine tool control and in any of the numerous applications where a simple and reliable yet precise positional remote control mechanism is desired.

The present invention concerns itself with the combination of the actuating output member and the valve control device which latter controls the output member and neither independent of the other. Thus the present invention concerns itself only with providing a condition of stable operation for the valve and actuator combination without regard of the fact that the valve alone may be unstable, as indeed it is in the invention disclosed herein.

In order more clearly to describe the key features inherent in the invention, there are included here comments relative to the existing state of the art.

There exist numerous examples of so-called electrohydraulic transfer valves commercially available at the present time. These devices are designed without exception to accept an electrical input signal and to operate so as to position a valve spool, or spools, such that the displacement of the spool relative to the sleeve in which it operates is proportional to the intensity or magnitude of the input signal. Thus if the input signal is of zero magnitude, the valve spool is at its neutral position relative to its coacting sleeve, the neutral position being that wherein the valve ports are closed and no flow exists. For any signal magnitude other than zero the valve spool is displaced a linear distance from its neutral position by an amount directly proportional to the input signal magnitude and in a direction corresponding to the polarity of the input signal.

Such valve action is referred to as "stable" valve action wherein for a given condition of input signal there exists a corresponding valve spool position. Because most of the applications of such valves are in servo systems, the signal input to the valve is proportional to the instantaneous error or to a function of the instantaneous error existing in the overall system. The error has been defined as the difference between the existing (actuator) output position and the position called for by a command input.

It should be pointed out that, although reference is made to electro-hydraulic valve devices, the present invention is not restricted to signal inputs of an electrical nature only.

It should be noted that most valves for servo applications are of the so-called linear flow rate type. That is, for a given valve spool displacement, a proportional area within the valve mechanism is uncovered through which flow can occur. Therefore, since the volumetric flow rate, for a fixed pressure differential across an orifice, is proportional to the area of the orifice, the shapes of the ports located in the valve sleeve are rectangular in section. Thus as the valve spool land uncovers a rectangular port, an area through which flow can occur exists which is proportional to the valve spool longitudinal displacement. Then, again assuming a fixed pressure differential across the valve orifice, volumetric flow rate through the valve orifice is a linear function of the error signal.

The pressure differential across the valve orifice is in all cases a function of the load against which the actuator operates. If the load opposes the actuator motion the effective pressure drop across the valve, and hence the volumetric flow rate through the valve (to the actuator) diminishes. If the load is overhauling, the pressure drop and the corresponding flow at the valve increase in magnitude.

The pressure drop across the valve, regardless of whether the valve is of the three way configuration or the more widely used four way configuration, is a direct function of the output load. The valve spool displacement is directly related to the port area uncovered by the valve spool. For a so-called linear valve this area, by virtue of a rectangular port shape, is proportional to spool displacement or the magnitude of the error signal.

The flow rate through the orifice is proportional to the arithmetical product of the port area and the square root of the pressure drop across the port. Obviously the dynamic operation of the conventional valve controlled servo device is dependent upon the nature of the output load and an exceedingly precise geometrical configuration of the valve ports.

The subject invention provides a valve and actuator configuration with very simple interconnections which results in a servo device which is relatively insensitive to the condition of the output loading and which is not dependent upon a precise geometric valve orifice configuration. Thus the operation of the device is independent of those features which are all important in the conventional device. The usefulness of the device is thereby enhanced greatly and those features and considerations which contribute in the greatest degree to the cost of conventional devices have effectively been eliminated.

The primary object of the present invention is to provide a valve controlled hydraulic actuating device, which device is conjunction with the valving means and an appropriate outer loop feedback closure constitutes a servo device which is capable of operation essentially independent of loading imposed on the output member.

An equally important object of the invention is to provide a valve controlled hydraulic actuating device, the dynamic operation of which device is essentially independent of the valve port configuration. That is, in terms commonly used in this connection, the operation is independent of the "slope of the flow curve" where this latter phrase refers to the flow characteristics of the valve as a function of spool displacement.

A still further object of the invention is to provide a device which is capable of reduction to a specific design by persons skilled in the applicable arts, which design configuration shall be more readily producible by known and accepted production techniques than now existing configurations.

In exemplification of the invention, preferred embodiments thereof are shown in the accompanying drawings; in which—

Figure 1:
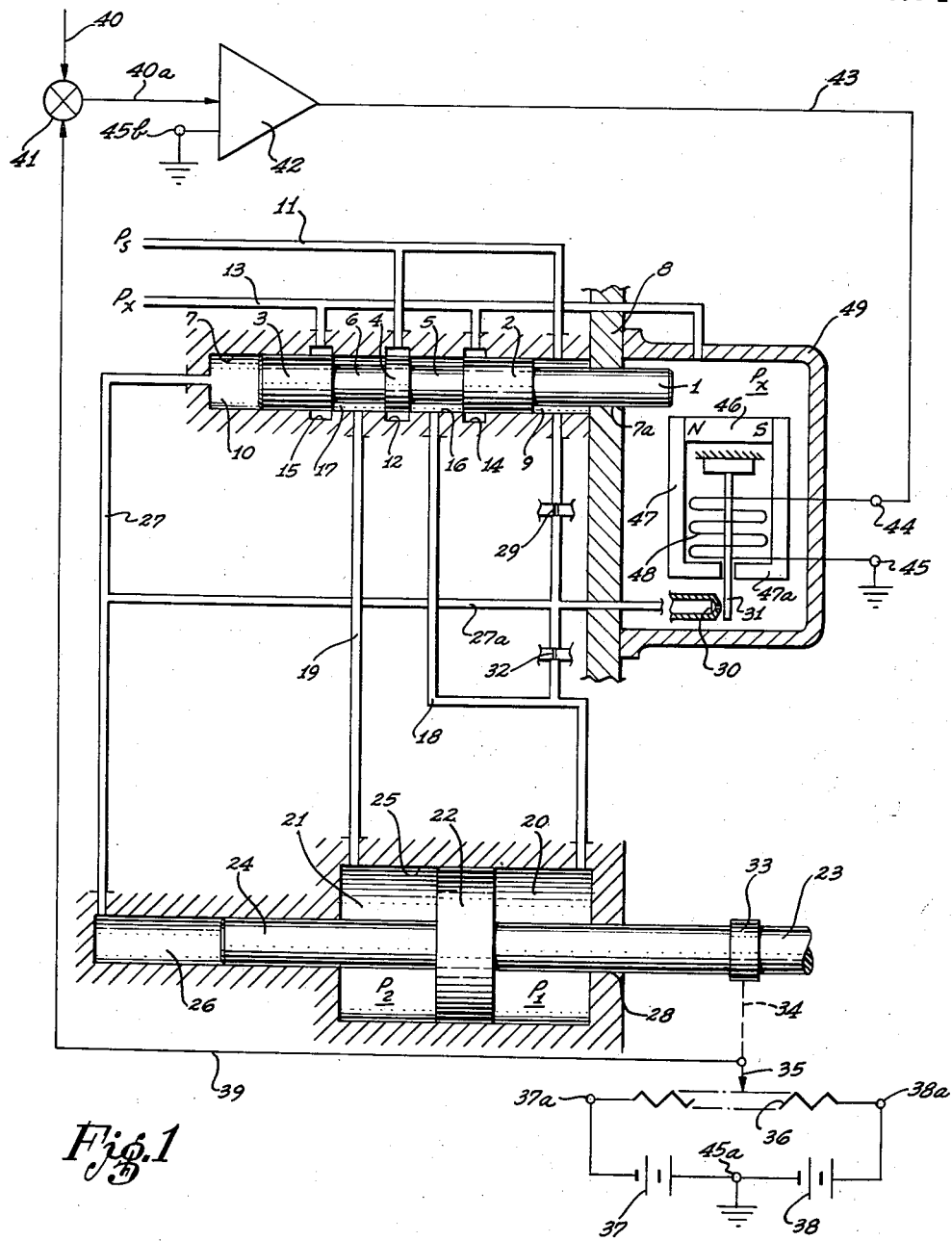
Figure 1 is a functional schematic representation of the invention illustrating the operation of the device as applied to a single nozzle type of hydraulic preamplifier upstream of the valve spool, and with a four way valve configuration operating into a balanced area actuator.

Referring now in detail to the functional interconnections illustrated in Figure 1, the reference numeral 1 designates a shaft extension of the control valve spool. The control valve spool is shown as comprised of three enlarged diameter lands. The two outboard lands are designated 2 and 3 with the central land designated 4. The reduced diameter sections intermediate of the lands are designated 5 and 6.

The valve spool is in intimate sealing relationship with bore 7 and is freely slideable longitudinally in said bore. Bore 7 may be integrally part of the valve housing structure or may be contained within a separate sleeve which sleeve is contained within the structure of the valve housing. It is pointed out that the various structural details are well known in the hydraulics art and that detailed discussion of these has been omitted in order more clearly to describe the functional aspects of the invention.

End plate (or bushing) 8 is provided with a bore 7a which bore is in intimate sealing relationship with valve spool extension 1. The end plate 8 is securely fastened to the valve housing structure so as to prevent fluid leakage out of chamber 9. Chamber 9 is seen to be annular in shape and formed by valve spool extension 1, bore 7, land 2 and end plate 8. The diameter of valve spool extension 1 is such that the area presented to the pressure existing in chamber 9 is substantially one half the area presented to the pressure existing in chamber 10. Chamber 10 is seen to be located at the left of the valve spool and to be formed by the blind end of bore 7 and the flat end surface of land 3.

Pressurized fluid is supplied through conduit 11. The pressure level of the high pressure supply $P_s$ is presumed to be constant, say 3000 p.s.i. The pressurized fluid is in direct fluid communication with chamber 9 and control port 12 of the valve. Control port 12 is shown in the figure as an annular groove formed in bore 7. It is common practice in servo valves to provide rectangular broached holes in order to provide the linear flow characteristics required in the conventional design. As will be made clearer in this description, this linear port configuration has been rendered unnecessary in the present invention.

Fluid at return line pressure $P_x$, say at atmospheric pressure, communicates through conduit 13 with control ports 14 and 15. Control ports 14 and 15 are identical in configuration to control port 12 described above. In this connection however note that the lands 2 and 3 are considerably longer than the widths of the respective control ports 14 and 15.

With the valve spool at its neutral position as shown in the figure, fluid from control port 12, which fluid exists at supply pressure $P_s$, leaks at a very minute rate past both sides of land 12 into annular valve chambers 16 and 17 with the two leakage rates being approximately equal in magnitude. Simultaneously fluid at pressures lower than $P_s$ existing in chambers 16 and 17 leaks into control ports 14 and 15 respectively. The neutral position of the valve is defined as that wherein the rate of leakage flow into chamber 16 from control port 12 is equal to the rate of leakage flow out of chamber 16 to control port 14 while simultaneously the rate of leakage flow into chamber 17 from control port 12 is equal to the rate of leakage flow out of chamber 17 to control port 15.

For a condition of no load the pressure $P_1$ existing in chamber 16 is for practical purposes equal in magnitude to the pressure $P_2$ existing in chamber 17. A load imposed on the system results in a proportional difference in the pressure levels at $P_1$ and $P_2$ with the incremental increase in one (relative to the no load condition where the two are equal) being for practical purposes equal to the incremental decrease in the other. With a supply pressure $P_s$ of 3000 p.s.i. and a return line pressure $P_x$ at atmospheric pressure, $P_1$ and $P_2$ for a no load condition exist at the common pressure level of 1500 p.s.i. This assumes that the load bias caused by the constant pressure acting against response piston 24 is small enough to be neglected, as indeed it is in the typical design because the area of the response piston is very much smaller than the area of the actuator piston exposed to pressure in either chamber 20 or 21.

Referring again to Figure 1 it is seen that valve chamber 16 is in fluid communication through conduit 18 with actuator chamber 20. Similarly valve chamber 17 is in fluid communication through conduit 19 with actuator chamber 21.

The actuator, as shown in the figure, is shown to be comprised of a piston 22 with integral shaft extensions 23 and 24, which piston operates in a cylindrical housing 25. Shaft extension 23 extends outwardly from the cylindrical housing 25 through a fluid tight seal 28. Shaft extension 23 is mechanically connected to the output load and represents the output member of the valve controlled actuating system.

Now if the valve spool is displaced, say to the right of its neutral position, fluid is constrained to flow from control port 12 into annular chamber 17 through conduit 19 into actuator chamber 21 resulting thereby in an increase in the volume contained in said chamber 21. Simultaneously as chamber 21 increases in volume, chamber 20 decreases in volume with the fluid discharged from this latter chamber transported through conduit 18 into annular chamber 16 and thence through control port 14 into return line 13. Thus for any given valve spool displacement to the right of its neutral position there exists a corresponding actuator output member velocity to the right, assuming unchanging load conditions.

Similarly if the valve spool is displaced to the left of its neutral position, fluid is constrained to flow from control port 12 into annular chamber 16 through conduit 18 into actuator chamber 20. Simultaneously as chamber 20 increases in volume, chamber 21 must experience a similar decrease in volume. Fluid displaced from chamber 21 flows through conduit 19 into annular chamber 17 and thence through control port 15 into return line 13. Thus for any given valve spool displacement to the left of its neutral position there exists a corresponding actuator output member velocity to the left.

By continuously controlling the valve spool displacement the actuator output motion can be continuously controlled. Referring again to Figure 1 it is seen that chamber 9 at the right hand end of the valve spool is connected to supply line pressure, which pressure $P_s$ is of a constant magnitude. For the valve spool to be in a condition of static equilibrium the pressure existing in chamber 10 at the left hand end of the valve spool must necessarily exist at a pressure equal in magnitude to one half of the constant magnitude supply pressure. This is so because the area exposed to the pressure contained in chamber 10 is twice that exposed to the pressure of the fluid contained in chamber 9. It is assumed, of course, that there is no mechanical restraint on the valve spool and that friction and inertia forces at the valve spool are negligibly small. Further it is assumed that the fluid system is a continuum and that no discontinuities such as entrained air or cavitation exist within the continuum.

The valve spool displacement is determined completely by the volume of fluid contained in chamber 10. Thus it is necessary only to control the volume contained in said chamber in an appropriate manner to effect complete and continuous control of the output member.

Referring again to Figure 1 it is seen that an extension of conduit 11 extends downward from chamber 9 to a fixed orifice or restriction 29. The downstream side of fixed orifice 29, through conduit 27a and conduit 27 is in fluid communication with chamber 10. Therefore there exists a constant pressure differential across orifice 29, which pressure differential is the difference in pressure level between the constant pressure $P_s$ existing at all times in chamber 9 and the pressure $Ps/2$ existing in chamber 10. Because the pressure drop existing across the fixed orifice is constant, the volumetric flow rate through the orifice is likewise constant.

Note that conduit 27a communicates also with nozzle 30, which nozzle is fixed and immovable in the valve body structure. A vane 31 is located adjacent to nozzle 30 such that an orifice of variable restriction is formed by the coacting elements, that is nozzle 30 in cooperation with the adjacent flat surface of vane 31. It is now apparent that flow through fixed orifice 29 tends to increase the volume contained in chamber 10 while simultaneously flow through nozzle 30 tends to decrease the volume contained in chamber 10. Thus by deflecting the vane 31 through minute displacements the volume contained in chamber 10 can be varied and the control valve spool displaced. The mechanism by which the vane displacement is controlled is of no consequence in the present invention but it is pointed out that in a conventional electro-hydraulic valve an electro-magnetic transducer is used which transducer receives signals of an electrical nature. The signal intensity is proportional to the system instantaneous error and is usually of a maximum order of magnitude of, say, ten milli-amperes.

For a steady state condition of rest or zero velocity output, the valve spool must be stationary at its neutral position. This implies that the constant flow rate into chamber 10 through the fixed orifice 29 must be precisely equal to the flow rate out of chamber 10 through the variable orifice comprised of nozzle 30 and vane 31. The vane position of this condition is its neutral position (it being assumed that return line pressure $P_x$ exists downstream of the variable orifice).

Assume now that the vane 31 is displaced slightly to the left of its neutral position so as to restrict flow out of nozzle 30. This results in an increase in volume contained in chamber 10 and a corresponding valve spool displacement to the right. (It is pointed out that there is no variation in the pressure level of the fluid contained in chamber 10 since the valve spool is presumed to be freely movable.) Simultaneously with valve spool displacement to the right of its neutral position, in the manner previously described, the actuator output member, under control of the valve, moves to the right. As the actuator moves to the right the volume contained in chamber 26 increases. Chamber 26 is seen to be formed by piston shaft extension 24 and the blind bore in which it operates. Chamber 26 is in fluid communication with chamber 10 through conduit 27. Thus as the actuator output member moves to the right resulting in an increase in the volume contained in chamber 26, this volume increase is accommodated by drawing fluid out of chamber 10 which tends to return the valve spool towards its neutral position and further to prevent continuing valve spool displacement.

Actuator shaft extension 24 therefore is a response piston. This response piston in conjunction with conduit 27 and chamber 10 provides a very tight internal feedback loop closure between the actuator output member and the control valve spool. The coacting elements of the internal hydraulic feedback loop operate so that a signal proportional to actuator velocity is fed back to the unrestrained valve spool. The signal just mentioned is represented by a volumetric displacement rate from chamber 26 to chamber 10. As is well known in the art, whenever a tight feedback loop closure is provided around a non-linear element within a system, the non-linearities involved are obscured. In this case the valve element has basic non-linearities inherent in its operation, especially so if rectangular port shapes are not used in the construction of the valving member. The provision of the internal hydraulic feedback loop obviates the necessity for providing precisely formed rectangular port shapes within the valving member and permits the use of more easily formed round drilled holes.

The fixed vane displacement to the left results initially then in displacement of the valve spool to the right with resulting actuator output motion to the right. The feedback loop as described above then limits valve displacement to that precise point where the actuator output velocity is proportional to the vane displacement. The steady state volumetric demands for increasing volume of chamber 26, resulting from actuator output member constant velocity to the right is accommodated by the excess of volumetric flow rate in through fixed orifice 29 over that out through the nozzle 30. The magnitude of the restriction of fixed orifice 29 can thus be utilized as a velocity limiting feature in any specific design configuration.

For a condition wherein the vane is displaced to the right of its neutral position by a small but finite increment an oppositely similar set of events take place. The resulting increased flow rate through nozzle 30 causes an initial decrease in the volume contained in chamber 10 with resulting valve spool displacement to the left. Again in the manner previously described, resulting actuator output motion is to left. The volume displaced by response piston 24 is transferred to chamber 10 again tending to return the valve spool towards its neutral position. The steady state equilibrium condition is reached wherein the valve spool is stationary and displaced to the left of its neutral position and the actuator output member is moving to the left at constant velocity. The fluid displaced by the response piston 24 is allowed to flow out of nozzle 30. In this case the fluid flow out through the variable orifice comprised of nozzle 30 and vane 31, is the sum of the flow through fixed orifice 29 and that displaced by the response piston.

The combination of the fixed orifice 29, the nozzle 30, the vane 31 together with chambers 9 and 10 and the interconnecting conduits comprise a hydraulic preamplifier. This stage of amplification exists between the vane 31 and the valve spool itself. The vane 31 in this regard is the input member. Even if the spring rate of the vane itself is very high, considering the vane to be a cantilevered beam with one end fixedly secured to structure, because only very small displacements are required, the force level of the input disturbance need only be of small magnitude. The preamplifier feature is important in the event of valve spool sticking or binding. Consider the abnormal, but by no means unusual, case where a piece of foreign material, such as a metallic chip, enters the valving mechanism. Under such conditions the pressure existing in chamber 10 can adjust its magnitude above or below, depending on which direction of motion at the valve spool is impaired, its normal pressure until sufficient force is developed at the spool to shear off the foreign particle after which normal operation resumes.

An additional feature of the present invention as the invention is preferably carried out is the inclusion of means for feeding back to the unrestrained valve spool an additional signal directly related to the load against which the actuator is operating. Such provision for modifying valve spool position as a function of load is necessary to ensure stable system operation under extreme loading imposed on the actuating output member.

Referring again to Figure 1 it is seen that an orifice 32 of fixed restriction is shown as being located in an interconnection between conduit 18 and conduit 27a. Thus there is provided a flow path of fixed restriction between chamber 10 and actuator chamber 20. Recalling now, as previously pointed out, that the pressure level in chamber 10 exists essentially at a constant magnitude of $Ps/2$, and that the departure of the pressure level $P_1$ in actuator chamber 20 from a magnitude of $Ps/2$ is directly proportional to the output loading applied to the actuator, it can be seen that a volumetric flow rate through orifice 32 is a function of the load induced pressure $P_L$.

It should be pointed out that orifice 32 can be fabricated so that the ratio of orifice diameter to orifice length is very large in which case the volumetric flow rate through said orifice is approximately proportional to the square root of the load induced pressure $P_L$, or the ratio of orifice diameter to orifice length can be very small in which case the volumetric flow rate through said orifice is approximately proportional directly to the magnitude of the load induced pressure. In this latter instance the orifice would more properly be referred to as a "choke tube" and might physically consist of a short length of capillary tubing.

Consider the case of the actuating output member of Figure 1 moving to the left against an externally applied load. In this case the pressure level of $P_1$ existing in actuator chamber 20 increases relative to its no load magnitude of $Ps/2$. Therefore a pressure differential, which pressure differential is proportional to the externally applied load, exists across orifice 32. Under the conditions stated, due to the increase in pressure level in chamber 20, there results a volumetric flow rate from conduit 18 through orifice 32 and conduits 27a and 27 into valve chamber 10. It will be noticed that the leakage flow through orifice 32 is additive to the fluid displaced by response piston 24 from chamber 26, which leakage flow further modifies valve spool position.

For an oppositely symmetrical set of conditions wherein the actuator is moving to the right against an externally applied load, the pressure level of $P_1$ existing in actuator chamber 20 decreases relative to its no load magnitude of $Ps/2$ proportionately as the variation in intensity of the externally applied load. Under these latter conditions the flow through orifice 32 is from chamber 10 through interconnecting conduits 27 and 27a into actuator chamber 20.

The action so described, as will be evident subsequently, results in system operation substantially independent of the internal geometry of the valving member regardless of the condition of output loading applied to the actuating output member.

Referring again to Figure 1 there is seen a collar 33 secured to actuator output shaft 23. A mechanical connection, shown as a dotted line 34, connects a potentiometer wiper 35 to said shaft 23. Output motion of the actuator causes a similar motion of wiper 35 relative to a potentiometer 36. Voltage sources 37 and 38 maintain fixed voltages at potentiometer terminals 37a and 38a, one terminal being positive relative to ground with the other being negative relative to ground. If terminals 37a and 38a are maintained at fixed voltages relative to ground, which voltages are equal in magnitude but of opposite polarity, the voltage at wiper 35 exists at a magnitude proportional to actuator output position and of a polarity determined by an actuator output position at one side or the other of its mid-stroke point.

The voltage at wiper 35, which voltage is a direct measure of actuator output position, is transmitted through an electrical connection 39 to an error measuring device 41. Error measuring device 41 simply compares a voltage proportional to a command input, which latter voltage is transmitted through electrical connection 40, with the voltage through connection 39. The difference, of course, is the system instantaneous error, which resulting error voltage is transmitted through connection 40a to amplifier 42. The output of amplifier 42 is a current proportional to the instantaneous system error (or some function of the error) and is transmitted through connection 43 to a terminal point 44 to which one end of coil 48 is connected with the other end of said coil being connected to ground at terminal point 45. The vane actuating transducer is seen to be comprised of permanent magnet 46, magnetic structure 47 and 47a, coil 48 and the vane 31 which latter element is fixedly secured at one end thereof to a portion of the stationary structure. The arrangement of said transducer element, is such that vane 31 is magnetically displaced proportionately as the magnitude and direction of the error signal through connection 43.

As shown in the figure, the magnetic vane actuating transducer, nozzle 30, and valve spool shaft extension 1 are contained within cap 49. The pressure of the fluid within cap 49, which cap is suitably secured to the structural housing, exists at a pressure level $P_x$, and the chamber so enclosed is connected to return line pressure $P_x$ by means of an extension of conduit 13 as shown.

It should be pointed out that the connections described, including common ground connections 45a and 45b at potentiometer 36 and amplifier 42 respectively, and the general arrangement of elements constituting the outer closed loop feedback, represent only one of many methods used and well known in the state of the art which could be adapted for providing an externally closed feedback loop without which the device would be inoperative.

In order more precisely to define the dynamic operation of the device, the following simple mathematical description is presented.

The volumetric flow rate $Q_v$ through the valve is a function of the valve spool displacement $X_v$ relative to its coacting sleeve, the load induced pressure $P_L$ and the magnitude of supply pressure $P_s$. This is expressed as (1) $\qquad Q_v = f(X_v, P_L, P_s)$ Since the magnitude of supply pressure $P_s$ is considered herein to be constant and not a variable, Equation 1 can be simplified to (1a) $\qquad Q_v = f(X_v, P_L)$ The usual manner in handling the basic and inherent nonlinearities involved is to consider the total flow rate $Q_t$ as being comprised of a steady-state flow rate $Q$ and a perturbation flow rate $q$ such that (2) $\qquad Q_t = Q + q$ Further, the perturbation flow rate is approximated as a first order Taylor's series expansion of $q$ as a function of $X_v$ and $P_L$.

In the discussion here the upper case notation $Q_v$ will be used to represent the perturbation flow rate $q$. Further, the discussion will concern itself with the application of a four way valve operating into a balanced area actuator as in Figure 1. It will be understood that the variables used in the discussion herein are perturbation variables, or small variations about respective steady-state operating points.

The purpose in making these qualifying statements is not for the purpose of restricting the scope of the discussion but merely to establish consistency between the discussion herein and the now commonly used method of analyzing the dynamics of valve controlled servo devices. It is further pointed out that the general method used in the discussion is equally applicable to valve configurations other than the four way kind operating into actuators other than the balanced area kind.

Figure 3:
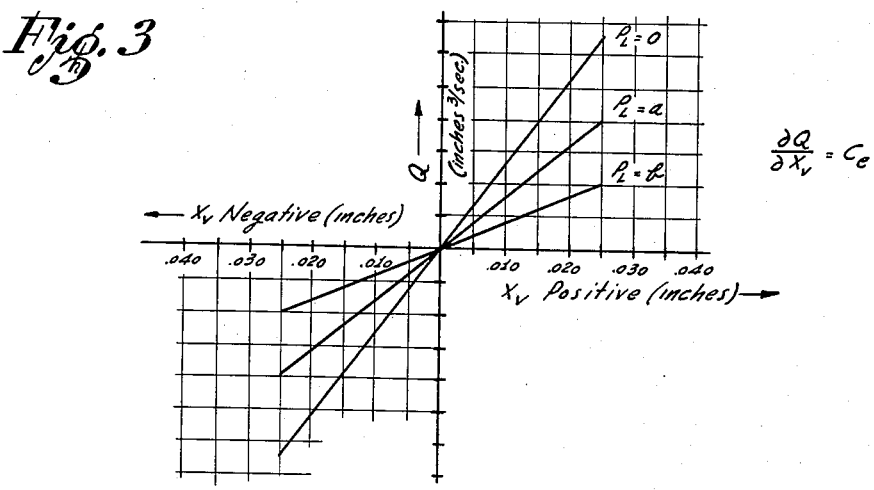
Figure 3 is a diagram in rectangular coordinates showing the variation in flow through the valve in any convenient units, as for example cubic inches per second, plotted against valve spool displacement from neutral for several values of load induced pressure $P_L$.

Consistent with the comments above, the (perturbation) flow rate as a function of valve displacement $X_v$ and the load induced pressure $P_L$ is (3) $\qquad Q_v = \dfrac{\partial Q}{\partial X_v} X_v + \dfrac{\partial Q}{\partial P_L} P_L$ or (3a) $\qquad Q_v = C_e X_v - C_p P_L$ in which $C_e$ is the "slope of the flow curve" representing the volumetric flow rate through the valve as a function of valve displacement $X_v$ for a specific magnitude of load induced pressure $P_L$. It will be noticed that a whole family of curves is represented, there being a different curve for every one of an infinite number of values of $P_L$. The family of curves is illustrated in Figure 3 with the straight line type of curve indicating that rectangular porting is used within the valve structure. If the more easily formed round holes are used for the internal porting, that portion of the curve near neutral would have a lesser slope with said slope increasing with increasing valve spool displacement, and the general shape of the curve would be more nearly parabolic. It will be noted that the slope of the flow curve is always positive, that is the flow rate always increases for an incremental increase of valve spool displacement. Therefore the arithmetic sign implied in Equation 3a is consistent with the comments above.

Figure 4:
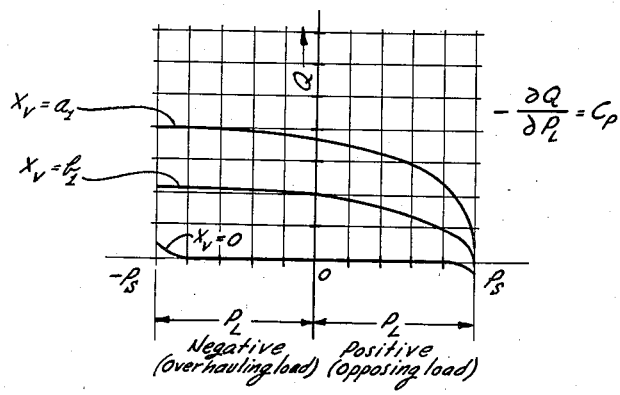
Figure 4 is a diagram in rectangular coordinates showing the variation in flow through the valve in any convenient units, as for example cubic inches per second, plotted against load induced pressure for several values of valve spool displacement $X_v$.

$C_p$ represents the variation in flow through the valve with changes in $P_L$, and again a family of curves is represented there being a different curve for every one of an infinite number of values of $X_v$. This latter family of curves is illustrated in Figure 4. It will be noticed that the slopes of this latter family of curves are always negative, this again being consistent with the arithmetic sign used in Equation 3a.

As is well known in the art of dynamic analysis of valve controlled hydraulic actuating devices, the flow rate $Q_v$ through the valve is accommodated by motion of the output member plus a small but by no means negligible flow rate which represents compressibility of fluid within the actuator chambers, which compressibility "flow" is a function of the compressibility of the fluid medium used and of the load induced pressure. This can be expressed as (4) $\qquad Q_v = A_p s X_o + \dfrac{V}{N} s P_L$ where $A_p$ is the effective area of the actuator piston
$X_o$ is the output member position
$V$ is the effective volume under compression
$N$ is the fluid bulk modulus (compressibility factor)
$s$ is the Laplace transformation variable The right hand sides of Equations 3a and 4, each being equal to $Q_v$, are equated to form (5) $\qquad C_e X_v - C_p P_L = A_p s X_o + \dfrac{V}{N} s P_L$ or (5a) $\qquad C_e X_v = A_p s X_o + \left(\dfrac{V}{N} s + C_p\right) P_L$ wherein all variables as hereinbefore stated are perturbations about a steady-state operating point. Further, the variables are $X_v$, $X_o$ and $P_L$. The quantities $V$, $N$ and $A_p$ are not considered to be variables in this instance.

Equation 5a represents the basic equation used in all dynamic analysis of devices of the type herein under consideration. When the particular nature of the loading applied to the device is specified, the variation of $P_L$ as a function of the actuator output motion can be calculated and introduced into Equation 5a above. When this is done, the resulting expression completely defines the dynamic operation of the device under the particular loading as specified.

Consider the load on the output member to be comprised of a concentrated mass $M$ attached to the actuator output member by means of an elastic coupling member having a spring rate $K_c$. This arrangement is shown in the diagrammatic representation of Figure 5.

The output force $F$ exerted by the actuator is the product of the effective piston area $A_p$ and the magnitude of the load induced pressure $P_L$.

(6) $\qquad F = A_p P_L$ where $P_L$ is the difference in pressure level existing across the piston head. Referring to Figure 1, $$P_L = P_1 - P_2$$

Figure 5:
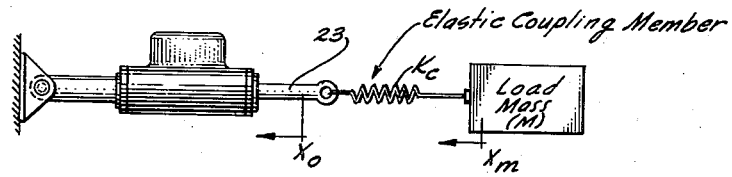
Figure 5 is a diagrammatic representation of a particular type of loading applied to the actuator output member.

The force $F$ is completely taken up by extension (or compression) of the elastic coupling member $K_c$. Referring now to Figure 5, (7) $\qquad F = K_c(X_o - X_m)$ where $X_o$ represents the actuator output position and where $X_m$ represents the instantaneously corresponding position of mass $M$. Positive displacements are taken to the left in both cases.

As is well known, a force cannot exist without there being an equal and opposing reaction. The reaction force $F_r$ is the force equivalent for accelerating the mass $M$.

(8) $\qquad F_r = M s^2 X_m$ since F must necessarily be equal to $F_r$, the right hand sides of Equations 7 and 8 are equal one to another.

(9) $$K_c(X_o - X_m) = Ms^2 X_m$$

from which (9a) $$X_m = \frac{K_c X_o}{Ms^2 + K_c}$$

combining Equations 8 and 9a

(10) $$F_r = \frac{K_c M s^2}{Ms^2 + K_c} X_o$$

since as previously stated, $F_r$ must necessarily be equal to F, Equations 6 and 10 are combined as

(11) $$P_L = \frac{K_c M s^2}{A_p(Ms^2 + K_c)} X_o$$

The relationship between the load induced pressure $P_L$ and the actuator output variable $X_o$ is given by Equation 11 for the particular type of loading specified. For any other type of loading a corresponding procedure can be carried out.

Returning now to a more detailed consideration of the invention as illustrated in Figure 1, it will be recalled that the valve spool displacement is determined completely by the volume of fluid then existing in chamber 10. This can be stated

(12) $$A_v s X_v = Q_o - Q_i$$

where $A_v$ is the area of the valve spool exposed to the pressure existing within chamber 10 (the quantity $sX_v$ represents the valve spool translational velocity); $Q_o$ is the volumetric flow rate out of chamber 10, and conversely $Q_i$ is the volumetric flow rate into said chamber. Positive spool displacement is taken to the left of the neutral position.

The flow out of chamber 10 is that which escapes through nozzle 30,

(13) $$Q_o = K_{ov}(X_{fo} + X_{fe})$$

where:

$K_{ov}$ is the variable orifice flow rate coefficient which defines the volumetric flow rate out of nozzle 30 as a function of vane displacement;

$X_{fo}$ is the vane position whereby the flow rate out of nozzle 30 is precisely equal to the flow rate in through fixed orifice 29;

$X_{fe}$ is the incremental displacement of the vane additive to the first-mentioned position ($X_{fo}$).

Thus the term $K_{ov}(X_{fo} + X_{fe})$ is the total volumetric flow rate out of nozzle 30 for any vane position.

The volumetric flow rate into chamber 10 is expressed as

(14) $$Q_i = A_r s X_o + Q_{of} + K_L P_L$$

where:

$A_r$ is the area of the response piston 24; the linear velocity of the response piston as in Figure 1 being identical to that of the output member;

$Q_{of}$ is the volumetric flow through the fixed orifice 29;

$K_L$ is a factor of proportionality relating the volumetric flow rate through fixed orifice 32 to the magnitude of the load induced pressure $P_L$.

Also by the previous definition of the term $X_{fo}$, the following relationship has been established

(15) $$Q_{of} = K_{ov} X_{fo}$$

One further relationship can be established. Since the device is a servomechanism constituted thereby in the provision of the outer loop closure, the vane position is proportional to the magnitude of the error. Hence

(16) $$X_{fe} = K_e E$$

where $K_e$ is a factor of proportionality relating vane displacement to the magnitude of the error signal E.

Combining Equations 12, 13, 14, 15 and 16

(17) $$K_{ov} K_e E = A_v s X_v + A_r s X_o + K_L P_L$$

Since, by definition, the error E is $X_i$ minus $X_o$ where $X_i$ represents the command input (17a) $$K_{ov} K_e X_i = A_v s X_v + A_r s X_o + K_{ov} K_e X_o + K_L P_L$$

By combining Equation 17a with the basic Equation 5a, the following general expression evolves

(18) $$K_{ov} K_e X_i = \left(\frac{A_v A_p}{C_e} s^2 + A_r s + K_{ov} K_e\right) X_o$$
$$+ \left(\frac{A_v V}{C_e N} s^2 + \frac{A_v C_p}{C_e} s + K_L\right) P_L$$

For the particular case wherein the load is as specified previously by Equation 11, substitution of (11) into Equation 18 yields

(19) $$\frac{X_o}{X_i} = \frac{K_{ov} K_e}{A_r} \frac{\left(\frac{M}{K_o} s^2 + 1\right)}{(A_4 s^4 + A_3 s^3 + A_2 s^2 + A_1 s + A_0)}$$

in which $$A_4 = \frac{A_v A_p}{A_r C_e}\left(\frac{M}{K_c} + \frac{M}{K_o}\right)$$

$$A_3 = \frac{A_v C_p M}{A_r C_e A_p} + \frac{M}{K_c}$$

$$A_2 = \frac{K_{ov} K_e M}{A_r K_c} + \frac{A_v A_p}{A_r C_e} + \frac{K_L M}{A_r A_p}$$

$$A_1 = 1$$

$$A_0 = \frac{K_{ov} K_e}{A_r}$$

wherein further the symbol $K_o$ represents the equivalent "fluid spring rate" or the compliance due to the fluid compressibility.

$$K_o = \frac{A_p^2 N}{V}$$

The expression given in Equation 19 is what is commonly referred to by practitioners of the art of servo design as the "closed loop transfer function." This transfer function is an expression of the relationship between the output variable $X_o$ and the then corresponding command input $X_i$. The transfer function completely defines the dynamic operation of the device.

The condition of dynamic stability can be verified by an examination of the denominator of the right hand side of Equation 19, this latter being given below:

$$A_4 s^4 + A_3 s^3 + A_2 s^2 + A_1 s + A_0$$

By Routh's stability criterion, for stability to exist, it is necessary that all the coefficients be positive and that $$A_1 A_2 A_3 > A_4(A_1)^2 + A_0(A_3)^2$$

Carrying out the mathematical operations indicated, the inequality expressed in terms of system parameters becomes $$\frac{K_L M C_p}{A_r A_p^2} + \frac{K_L M C_e}{A_v A_p K_o} + \frac{A_v C_p}{A_r C_e} > \frac{A_p}{K_o} + \frac{A_v M C_p^2}{t A_r A_p^2 C_e} + \frac{M C_p}{t A_p K_c}$$

in which the symbol $t$ represents a time constant and in which $$t = \frac{A_r}{K_{ov} K_e}$$

The condition for stability is indicated as being fulfilled when the sum of the three terms on the left hand side of the inequality positively exceed in magnitude the sum of the three terms on the right hand side of the inequality.

It will be noted that the first two terms of the left, these being dependent upon the magnitude of $K_L$ and each being proportional to said magnitude, reinforce the positive magnitude of the left hand side. If $K_L$ is zero, that is if fixed orifice 32 is omitted in the present invention, the first two terms of the left hand side of the inequality drop out.

As indicated in the inequality and which would be even more apparent if numerical values are assigned to the several parameters involved, there is evident no upper limit on the magnitude of $C_e$.

It is pointed out that $C_e$ in the conventional valve controlled hydraulic servo is essentially a "gain" term. Because of stability considerations in a conventional device the maximum value of $C_e$, or the maximum usable slope of the valve flow curve, is limited.

In the present invention the servo gain is essentially independent of $C_e$ or the slope of the valve flow curve primarily because of the internal feedback loop whereby displacement of the valve spool is immediately modified upon output member motion responsive to said displacement. The parameters which determine the gain in the present invention are $K_{ov}$, $K_e$ and $A_r$, each one of which is independent of load effects.

Therefore the operation of the device disclosed in the present invention is relatively insensitive to output loading effects and said device is not rendered incapable of stable operation by making $C_e$ very large, which last-mentioned consideration is highly desirable from a manufacturing standpoint.

Figure 2:
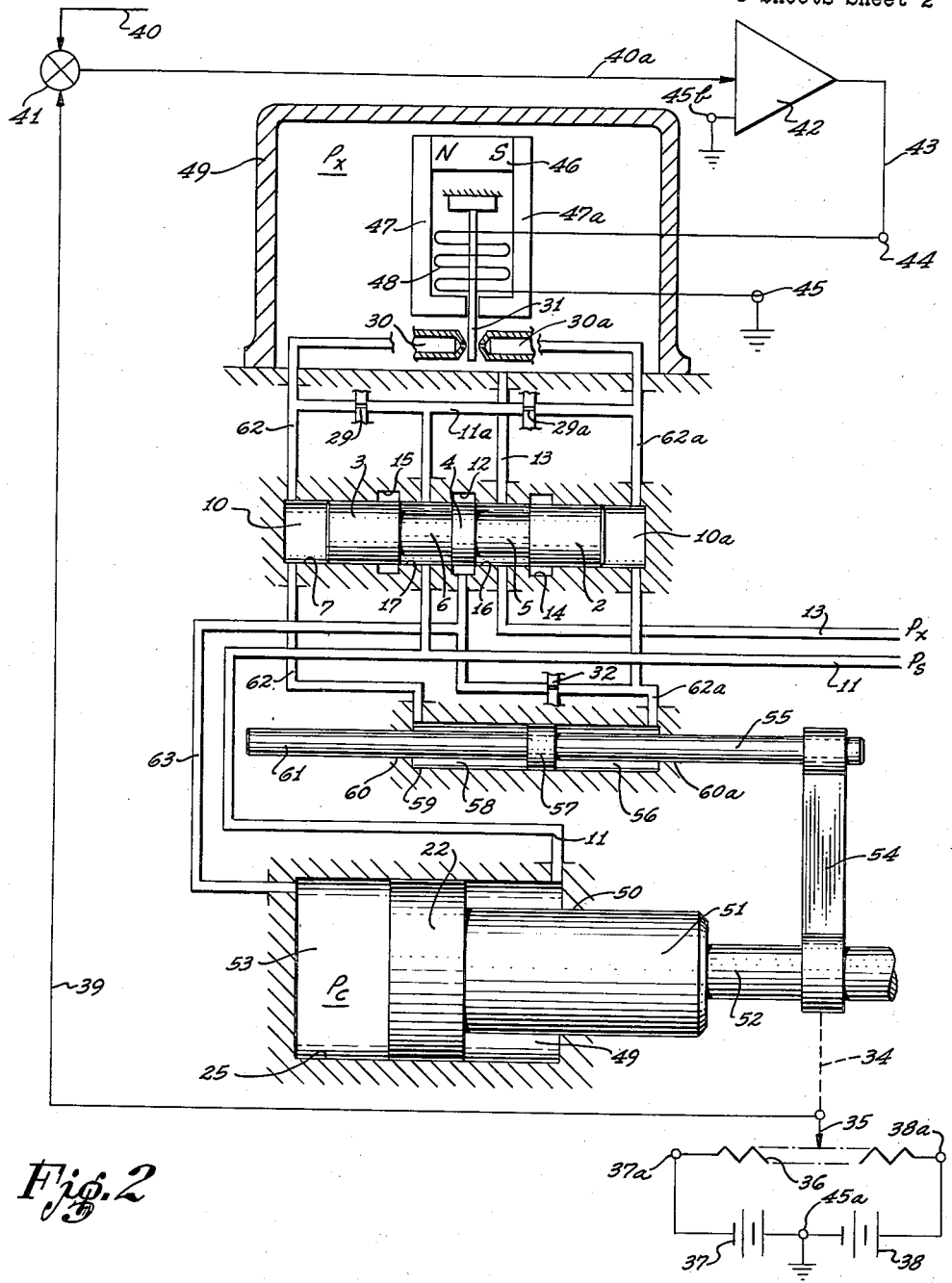
Figure 2 is a functional schematic representation of the invention illustrating the operation of the invention as applied to a double nozzle type of hydraulic preamplifier upstream of the valve spool and with a three way valve configuration operating into a differential area actuator.

A functionally similar arrangement is shown in the schematic representation of Figure 2. Here is illustrated a double nozzle hydraulic preamplifier used for position control of a valve spool very similar to that of Figure 1. Note that the valve spool ends in this case present equal areas to the pressures existing in the respective end chambers 10 and 10a. Also by a modification in the hydraulic connections (over those of Figure 1) the valve element in Figure 2 is shown operating as a three way valve. It will be noted therefore that either valve configuration can be made to operate as a three way valve or as a four way valve by selection of appropriate hydraulic interconnections.

The valve spool is shown (as in Figure 1) to be comprised of three enlarged diameter lands, the two outboard lands being designated 2 and 3 with the central land designated 4. The reduced diameter sections intermediate of the lands are designated 5 and 6. The valve spool is in intimate sealing relationship with bore 7 and is freely slideable therein. Bore 7 is closed at each end and thereby forms in conjunction with the respective end surfaces of the valve spool the closed chambers 10 and 10a.

Pressurized fluid $P_s$ is supplied through conduit 11. This pressurized fluid is admitted to annular chamber 17 of the valve, which chamber is formed by the reduced diameter section 6 and the flat side surfaces of the adjacent lands 3 and 4. In like manner annular chamber 16, which chamber is formed by the reduced diameter section 5 and the flat side surfaces of adjacent lands 2 and 4, is connected to return $P_x$ through conduit 13. The pressure level $P_x$ can be considered atmospheric.

With the valve spool at its neutral position as shown in the figure, fluid existing at high pressure $P_s$, say 3000 p.s.i., in annular chamber 17 leaks at a very minute rate past the left hand edge of land 4 into control port 12. Simultaneously fluid from control port 12 leaks out at the same rate as the leakage into said control port, past the right hand edge of land 4 into annular chamber 16 and thence through conduit 13 to return. For a condition of no load at the actuating output member and with $P_x$ assumed to be atmospheric, the pressure level existing in control port 12 is one half of supply pressure. A load imposed on the actuating output member will be reflected by a proportional variation in the pressure level $P_c$ which exists in control port 12.

The actuator, as illustrated in Figure 2, is seen to be comprised of a piston 22 integral with shaft extension 51. Also integral with the piston assembly is the output shaft 52 which drives whatever load is imposed on the actuating device. The piston operates in a cylindrical housing 25. Shaft extension 51 extends outwardly from housing 25 through a fluid tight seal 50. The diameter of shaft extension 51 is selected so that its cross-sectional area is one half (or approximately so) that of piston 22. Therefore the piston area presented to the pressure existing in chamber 49, which chamber is formed by the right hand flat surface of piston 22, the surface of shaft extension 51, the inner peripheral surface of cylindrical housing 25 and the right hand flat surface thereof, is one half of the area of the piston presented to the pressure existing in chamber 53.

Actuator chamber 53 is connected through conduit 63 to control port 12. Actuator chamber 49 is supplied with constant pressure supply $P_s$ directly from conduit 11. Actuator output motion in this instance is controlled completely by the continuous control of fluid flow into or out of actuator chamber 53 at whatever pressure level may exist in said chamber which pressure level $P_c$ is a function of output loading conditions. Therefore control port 12 is the only port within the valving mechanism where flow modulation takes place. In this connection the ports 14 and 15 of Figure 2 are not used and can be omitted. The reason for including these latter ports in Figure 2 is merely to illustrate a particular application which is actually used and is as shown in the figure.

Now if the valve spool is displaced, say to the right of its neutral position, fluid existing at high pressure in annular chamber 17 is constrained to flow into control port 12, through conduit 63 into actuator chamber 53 resulting thereby in an increase in the volume contained in said actuator chamber. The corresponding (but not equal) decrease in volume in actuator chamber 49 is accommodated by a flow through conduit 11 back to the supply source. Thus for any given valve spool displacement to the right of its neutral position there exists a corresponding actuator output member velocity to the right.

Similarly if the valve spool is displaced to the left of its neutral position, fluid is constrained to flow out of actuator chamber 53 through conduit 63 to control port 12 into annular chamber 16 and finally into return line conduit 13. This results, of course, in actuator motion to the left. Thus for any given valve spool displacement to the left of its neutral position there exists a corresponding actuator output member velocity to the left.

By continuously controlling the valve spool displacement the actuator output motion can be continuously controlled. Referring again to Figure 2 it is apparent that by simultaneous control of the volumes contained in chambers 10 and 10a the valve spool position can be controlled. Thus if chamber 10 increases in volume, accompanied by an equal decrease in the volume of chamber 10a, the valve spool is displaced to the right. Similarly if chamber 10 decreases in volume, accompanied by an equal increase in volume of chamber 10a, the valve spool is displaced to the left. It is assumed again herein that the valve spool is free of friction loading and that its inertia is negligible. Therefore variations in volume contained in chamber 10 and 10a occur with the pressure levels existing in said chambers being equal one to another. Continuous control of the volumes contained in chambers 10 and 10a causes continuous control of valve spool position and resulting actuator output motion.

It will be noted in Figure 2 that an extension 11a of conduit 11 supplies high pressure fluid to the upstream sides of two fixed orifices or restrictions 29 and 29a. The downstream sides of said orifices are in fluid communication through conduits 62 and 62a with chambers 10 and 10a. Because the orifice upstream pressure is constant $P_s$ and if there is negligible variation in the downstream pressure of each orifice, that is if the pressures existing in chambers 10 and 10a are constant and equal one to another, the volumetric flow rate through each orifice will be constant with the flow rates through each orifice being equal one to another.

Note that conduits 62 and 62a communicate respectively with nozzles 30 and 30a, which nozzles are fixed and immovable within the structure of the valve body. A vane 31 is located between said nozzles such that said vane presents a separate flat surface to each of the nozzles 30 and 30a. The nozzles are spaced relatively apart so that the vane deflection is limited, say, to one or two thousandths of an inch from each side of the vane neutral position. With the vane in its neutral position the volumetric flow rate out through nozzle 30 is precisely equal to the flow rate in through fixed orifice 29, there then being no net change in the volume contained in chamber 10; likewise the volumetric flow rate out through nozzle 30a is precisely equal to the flow rate in through fixed orifice 29a, there then being no net change in the volume contained in chamber 10a. The neutral position of the vane is that which results in the valve spool remaining stationary. The pressure levels existing in chambers 10 and 10a, the two being of common magnitude if the spool is freely slideable, depend upon the relative magnitudes of the pressure drop across the fixed orifice 29 or 29a referred to the pressure drop across the variable orifice nozzle 30 or 30a in conjunction with the vane 31 coacting flat surface. If, for example, the restriction through the fixed orifice is equal to that through the corresponding variable orifice, the pressure existing in chamber 10 (or in chamber 10a) is one half of supply pressure $P_s$ assuming that return line pressure $P_x$ exists at the vicinity of the vane (that is downstream of the variable orifice).

If the vane is displaced slightly to the left so as to restrict the flow out of nozzle 30 and simultaneously to permit increased flow out of nozzle 30a, because the flow rates through fixed orifices 29 and 29a are constant, it is seen that the volume contained in chamber 10 increases while simultaneously the volume contained in chamber 10a decreases. This results in valve spool displacement to the right and resultant actuator motion to the right. As the actuator moves to the right, a response piston 57 similarly moves to the right in its cylindrical chamber 59, which chamber can be considered to be stationary and an integral portion of the actuator housing. This motion of the response piston 57 causes a reduction in the volume contained within chamber 56 and an increase in the volume contained within chamber 58. Chamber 58 at the response piston is in fluid communication through conduit 62 with valve chamber 10; chamber 56 is in fluid communication through conduit 62a with valve chamber 10a. The volume displaced at the response piston chamber 56 increases the volume contained in valve chamber 10a while simultaneously the increase in volume of chamber 58 of the response piston is accommodated by drawing fluid out of valve chamber 10. Thus the valve spool displacement is limited and the response action is such to return the spool towards its neutral position.

Similarly if the vane is displaced slightly to the right of its neutral position so as to restrict the flow out of nozzle 30a and simultaneously to permit increased flow out of nozzle 30, in a manner similar to that described above, the valve spool is displaced to the left by the resulting increase in the volume contained in chamber 10a and the equivalent decrease in volume contained in chamber 10. Consequent actuator motion to the left and accompanying response piston 57 motion to the left stabilizes the changes in volume of chamber 10 and 10a in the manner already described.

Thus, in a fashion similar to the first case as shown in Figure 1, the response piston in conjunction with the hydraulic interconnections closes an internal feedback loop from the actuator output member around the control valve spool. Thus for a given vane displacement to the left of its neutral position there exists a corresponding and proportional steady state actuator output member volocity to the right; for a given vane displacement to the right of its neutral position there exists a corresponding and proportional steady state actuator output member velocity to the left. The operation described is linear, in a mathematical sense, and takes place in a stable fashion.

With further reference to Figure 2, the response piston 57 operates in a sealed bore 59. The left hand shaft extension of the response piston is designated by the reference numeral 61 and operates through a fluid tight seal 60. The right hand shaft extension of the response piston is designated by the reference numeral 55, which shaft extension operates through a fluid tight seal 60a. Response piston shaft extension 55 is shown in Figure 2 to be solidly and mechanically secured to actuator output shaft extension 52 by means of a rigid link 54. In this latter connection it should be pointed out that there is no restriction that such a solid link must be used. It is entirely feasible that a multiplying linkage be used to couple response piston shaft extension 55 to the actuator shaft extension 52 so that the response piston travels only a proportionate amount of the actuator output displacement if such is desirable in any particular design configuration.

The configuration as so far described and as illustrated in Figure 2 includes a stage of hydraulic amplification between the pilot member, vane 31, and the valve spool itself. As in the configuration shown in Figure 1, this latter configuration has the ability to exert a very large force on the valve spool if required in order for example to shear a piece of foreign material which should enter the valving mechanism.

As was provided in the configuration illustrated in Figure 1, the inclusion of means for modifying valve spool motion as a direct function of actuator output loading effects is similarly provided.

Referring to Figure 2 it is seen that an orifice 32 of fixed restriction is shown as being located in an interconnection between conduit 63 and conduit 62a. Thus there is provided a flow path of fixed restriction between chamber 10a and actuator chamber 53. Assuming now that the ratio of the areas of chamber 53 and 49 is two to one, the pressure existing within chamber 53 under the conditions of zero loading will be one half of supply pressure $P_s$. The pressure variation in chamber 53 from its nominal no load magnitude of $P_s/2$ will be proportional to the then existing load intensity.

Further asuming that the restrictions of the fixed orifices 29 and 29a, each being equal one to another, are made equal to similarly matched restrictions of the variable orifices, nozzles 30 and 30a in conjunction with coacting vane 31 and with said vane positioned at its neutral position, the common pressure level existing in chambers 10 and 10a exists at one half of supply pressure $P_s$.

Under the conditions stated there will result a flow into or out of valve chamber 10a through orifice 32 and connecting conduit 62a as a function of the load induced pressure variations occurring within actuator chamber 53.

In a manner analogous to that previously described for the configuration shown in Figure 1, the volumetric flow rate through orifice 32 from conduit 63 and thence through conduit 62a into chamber 10a is additive to the fluid displaced by the response piston 57 out of chamber 56 through conduit 62a into chamber 10a, which load induced flow through orifice 32 further modifies valve spool displacement.

Referring again to Figure 2, an outer closed loop feedback is shown provided by an identical arrangement of coacting elements as shown in Figure 1 and as previously described.

A mathematical description of the operation of the configuration shown in Figure 2 is not included here. Such a mathematical description would be similar to that previously presented and would yield a transfer function of identical form as that given previously in Equation 19.

It is pointed out that either configuration can be adapted for use as a three way valve working into a differential area piston type actuator (as in Figure 2) or as a four way valve working into a balanced area actuator (as in Figure 1). It is also to be noted that in either configuration the response piston may be integral with the actuator output member or may be separate from said member but mechanically connected thereto by means of a mechanical linkage, which linkage ratio may be unity or any ratio other than unity.

As has been indicated, only two of several possible embodiments of the present invention have been illustratively shown and described. These have been treated with considerable particularity of detail, not for the purposes of limitation, but to illustrate the capabilities of the invention. As will be understood variations and modifications are possible; and parts of the improvements may be used without others. Where for instance a multistage valve is referred to, there is meant a two or more stage valve. The scope of the protection contemplated is to be taken from the appended claims interpreted as broadly as is consistent with the prior art.

I claim:

1. A hydraulically powered servo device comprising, in combination, an output means including an output member, a two-stage valve means for controlling motion of said output member, said valve means including a movable second stage valving element, an outer closed loop feedback, an error detection means included in said outer loop for continuously comparing the output position of said output member with the then existing input command to said device, means for ensuring operation responsive to the instantaneous error to induce a movement of said output member toward a position sufficiently in agreement with said input command as to reduce said instantaneous error substantially to zero, and further means for adapting said servo device for stable operation essentially insensitive to variations of load and also to ensure that stable operation is essentially independent of the configuration of the fluid metering ports internal of said valve means, said further means incorporating a tightly closed internal hydraulic feedback loop between said output member and said movable valving element, said further means including means for modifying the position of the movable valving element as a function of the intensity of the loading imposed on the output member.

2. In apparatus of the kind described, in combination, an output means including an output member, a valve means for controlling motion of said output member, said valve means including a movable valving element, a hydraulic system in which are interposed said valve means and said output means, means for adapting said apparatus for stable operation essentially insensitive to variations of load and also to ensure stable operation essentially independent of the configuration of the fluid metering ports internal of said valve means, the means last-named including a plurality of means one of which is a means for transmitting to the valve means an input proportional to a function of the instantaneous error between an input command and the then existing position of the output member, another of said plurality of means incorporating a tightly closed internal hydraulic feedback loop between said output means and said valve means, which feedback loop transmits an input to the valve means in addition to the first-named input wherein the last-named input is a function of the motion of the output member, and another of said plurality of means including means for modifying the position of the movable valving element as a function of the intensity of the loading imposed on the output member.

3. An apparatus as defined in claim 2, wherein said movable valving element is a slidable valve spool unrestrained longitudinally within its coacting sleeve.

4. An apparatus as defined in claim 2, wherein there is upstream of said valve means a first stage hydraulic preamplifier and said hydraulic preamplifier being in series with said valve means with said hydraulic preamplifier being responsive to a signal proportional to a function of the instantaneous error.

5. A pressure fluid servo system for positioning a load in accordance with a changeable command, which system includes: an actuator reversibly operable by fluid introduced into said system from a relatively high supply pressure, and withdrawn at a relatively low exhaust pressure; a multistage valve system including an actuator operating stage and an input signal stage, the latter being adapted to produce movement in the former in response to input signals; an actuator position feedback loop for comparing actuator position with command and signaling said input signal stage to correct any difference; an actuator velocity sensing feedback loop for reducing the operation of said actuator operating stage in proportion to the velocity of said actuator; and a load magnitude feedback loop for modifying the operation of said actuator operation stage as a function of the magnitude of said load.

6. A pressure fluid servo system for positioning a load in accordance with a changeable command, which system includes: an actuator reversably operable by fluid introduced into said system from a relatively high supply pressure and withdrawn from said system to a relatively low exhaust pressure; an actuator valve having a freely reciprocable valve member adapted to operate said actuator reversably; first and second valve chambers associated with said valve member and adapted to receive fluid under pressure to urge said valve member in first and second opposite directions of reciprocation, respectively; means for supplying fluid under pressure to said first and second valve chambers; an input signal valve system for withdrawing fluid from at least one of said valve chambers at a variable rate, said valve system being adapted to control the direction and magnitude of movement of said valve member in response to an input signal; an actuator position feedback loop for comparing the position of said actuator with said command, and signaling said input signal valve system to correct any error; means for producing a volumetric flow of fluid to or from at least one of said valve chambers in proportion to actuator velocity; and a fluid leakage means in said system for placing at least one of said valve chambers in fluid communication with fluid in said system at a pressure which is a function of the load on said actuator.

7. A pressure fluid servo system for positioning a load in accordance with a changeable command, which system includes: an actuator reversably operable by fluid from a relatively high supply pressure and withdrawn to a relatively low exhaust pressure; an actuator valve having a freely reciprocable valve member adapted to operate said actuator reversably; first and second valve chambers associated with said valve member and adapted to receive fluid under pressure and urge said valve member in first and second opposite directions of reciprocation respectively; variable orifice means for continuously withdrawing fluid from at least one of said valve chambers; actuator position comparison feedback means for comparing the position of said actuator with said command and varying said variable orifice in accordance with the difference to move said actuator towards elimination of said difference; a response piston movable in response to the movement of said actuator in a response chamber, said response chamber being in fluid communication with at least one of said valve chambers to modify the displacement of said valve body; and leakage path means placing at least one of said valve chambers in fluid communication with a chamber in said actuator having a pressure which is a function of the load on said actuator.

8. A pressure fluid servo system for positioning a load in accordance with a changeable command, which system includes: an actuator reversably operable by fluid introduced into the system from a relatively high supply pressure and withdrawn to a relatively low exhaust pressure; an actuator valve having a freely reciprocable valve member adapted to connect said actuator to said fluid at said supply and exhaust pressures in either direction and at a magnitude of pressure drop through said valve which is a function of displacement of said reciprocable body from a neutral position, said valve being adapted to produce an equal pressure drop in simultaneously inflowing and outflowing streams; first and second valve chambers associated with said valve member and adapted to receive fluid under pressure to urge said valve member in first and second opposite directions of reciprocation respectively; means for supplying fluid under pressure to said first and second valve chambers; variable orifice means for withdrawing fluid from one of said valve chambers; actuator position comparison feedback means for comparing the position of said actuator with said command and varying said variable orifice in accordance with the difference to move said actuator toward elimination of said difference; a response piston integrally movable with said actuator in a response chamber, said response chamber being in fluid communication with at least one of said valve chambers to modify the displacement of said valve member; and orifice means placing at least one of said valve chambers in fluid communication with a chamber in said actuator having a pressure which is a function of the load on said actuator.

9. A pressure fluid servo system for positioning a load in accordance with a changeable command, which system includes: an actuator reversably operable by fluid introduced into said system at a relatively high supply pressure and withdrawn to a relatively low exhaust pressure; an actuator valve having a freely reciprocable valve member adapted to operate said actuator reversibly; first and second valve chambers associated with said valve body and adapted to receive fluid under pressure and urge said valve member in first and second opposite directions of reciprocation respectively; double variable orifice means for continuously withdrawing fluid from said valve chambers at inversely variable rates; actuator position feedback means for comparing the position of said actuator with said command and varying said double variable orifice means in accordance with the difference to move said actuator towards elimination of said difference; double-acting response piston movable in association with said actuator in a response chamber, fluid on opposite faces of said piston being in fluid communication with said valve chambers to modify the displacement of said valve member; and leakage path means placing at least one of said valve chambers in fluid communication with a chamber in said actuator having a pressure which is a function of the load on said actuator.

10. A system as described in claim 9 in which said actuator is an unbalanced piston subject to fluid at supply pressure on the smaller area face and to fluid at a pressure proportional to the load on the larger area face and said leakage path means provides fluid communication between said larger area face and at least one of said valve chambers.

11. A pressure fluid servo system for positioning a load in accordance with a changeable command, which system includes: an actuator to position said load, said actuator including a piston reversably movable by fluid, and having a smaller side in fluid communication with a source of fluid at a relatively high supply pressure, and a larger side exposed to fluid in said system at a pressure proportional to said load; an actuator control valve containing an unrestrained valve spool for reversably positioning said actuator piston by controlling the rate at which fluid is admitted to said larger side thereof; means for supplying fluid under pressure to valve chambers at opposite ends of said unrestrained valve spool, so as to position said valve spool; variable orifice means for continuously removing said fluid from said valve chambers to a relatively low exhaust pressure; an actuator position feedback loop for continuously comparing said actuator position with said command and changing said variable orifice in accordance with the instantaneous difference detected; a double acting response piston integrally movable with said actuator piston in a response piston chamber communicating at opposite ends with said valve chamber, respectively; means communicating between the interior of said actuator on the larger side of said actuator piston and at least one of said valve chambers to produce a flow of fluid between said actuator chamber and said valve chamber dependent in direction and magnitude upon the load on said actuator.

12. A pressure fluid servo system for positioning a load in accordance with a changeable command, which system includes: an actuator to position said load, said actuator including a piston reversably movable by fluid introduced to one side from a relatively high supply pressure and withdrawn from the other side to a relatively low exhaust pressure; a control valve containing an unrestrained valve spool for supplying said fluid from supply pressure to one side of said actuator piston and withdrawing fluid to exhaust pressure from the other side of said piston, in a direction and at a rate determined by the position of said valve spool; means for supplying said fluid at supply pressure to a first valve chamber at a first end of said unrestrained valve spool, so as to urge said valve spool in a first direction; orifice means for continuously removing said fluid from said first valve chamber, said orifice means being adapted to discharge said fluid at a pressure intermediate said supply pressure and said exhaust pressure; a second valve chamber at a second end of said spool, opposite said first end, and adapted to receive said fluid downstream from said first orifice and to urge said spool in a second direction reverse to said first direction, the cross section of said spool exposed to said second chamber being proportionately larger than that exposed to said first chamber to produce balancing longitudinal forces on said unrestrained spool; a variable orifice for withdrawing fluid downstream from said first orifice at a selectively variable rate, and adapted to produce movement of said spool in said second direction by restricting said variable orifice sufficiently to divert fluid to said second chamber without substantially increasing the pressure downstream from said first orifice; an actuator position comparison feedback loop for continuously comparing said actuator position with said command and changing said variable orifice in accordance with the instantaneous difference detected; a response piston integrally movable with said actuator piston in a response piston chamber communicating with said second valve spool chamber; and orifice means communicating between the interior of said actuator on one side of said actuator piston and said second valve spool chamber to produce a flow of fluid through said orifice dependent in direction upon the direction of the load of said actuator, and in magnitude upon the magnitude of said load.

13. A hydraulic servo system for positioning a load in accordance with a changeable command, which system includes: an actuator to position said load, said actuator including a double-acting piston reversably movable in a cylinder by liquid introduced to or withdrawn from opposite ends of said cylinder; an actuator control valve containing an unrestrained valve spool reciprocable in a valve cylinder for supplying fluid to or withdrawing it from at least one end of said actuator cylinder at a rate determined primarily by the position of said valve spool; means for supplying fluid to each end of said valve cylinder to position said unrestrained valve spool therein; first orifice means for continuously passing fluid from a relatively high supply pressure to at least one end of said valve cylinder at a lower intermediate pressure; opening orifice for withdrawing fluid downstream from said first orifice means at a selectively variable rate, and adapted to position said spool in said valve cylinder without substantially changing the pressure downstream from said first orifice; an actuator position feedback loop for continuously comparing said actuator position with said command and changing said variable orifice in accordance with the instantaneous difference detected; a response piston integrally movable with said actuator piston in a response piston cylinder communicating with at least one end of said valve cylinder; and orifice means placing at least one end of said valve cylinder in fluid communication with a side of said actuator piston at which fluid pressure is proportional to the load on said actuator to produce a flow of fluid therethrough dependent in direction upon the direction of action of said load, and in magnitude upon the magnitude of said load.

14. A pressure fluid servo system for operating an actuator in accordance with a changeable command, said system comprising an actuator operable by fluid under pressure, means subject to the changeable command for producing an input signal, means including a valve operated by said input signal for subjecting said actuator to fluid under pressure to operate the same, error comparison means for sensing the difference between the position of said actuator and said command and for modifying said input signal to decrease the error, means for sensing the velocity of said actuator and for modifying said input signal in proportion to the velocity of said actuator, and means for sensing the load opposing movement of said actuator for modifying said input signal in proportion to said load.

15. A servo system for operating an actuator in accordance with a changeable command, said system comprising an actuator, means subject to the changeable command for producing an input signal, means operated by said input signal for moving said actuator, error comparison means for sensing the difference between the position of said actuator and said command and for modifying said input signal to decrease the error, means for sensing the velocity of said actuator and for modifying said input signal in proportion to the velocity of said actuator, and means for sensing the load opposing movement of said actuator for modifying said input signal in proportion to the load.

References Cited in the file of this patent

UNITED STATES PATENTS

| | | |
|---|---|---|
| 752,491 | Warren | Feb. 16, 1904 |
| 2,020,847 | Mitereff | Nov. 12, 1935 |
| 2,188,834 | Fischel et al. | Jan. 30, 1940 |
| 2,236,467 | Clench | Mar. 25, 1941 |
| 2,503,447 | May | Apr. 11, 1950 |
| 2,616,397 | Ruud et al. | Nov. 4, 1952 |
| 2,649,841 | Jacques | Aug. 25, 1953 |
| 2,738,772 | Richter | Mar. 20, 1956 |

OTHER REFERENCES

Bulletin of the Seismological Society of America, vol. 26, No. 3, July 1936, pages 202 and 203.